US008158551B2

(12) United States Patent
Verdier et al.

(10) Patent No.: US 8,158,551 B2

(45) Date of Patent: Apr. 17, 2012

(54) CATALYST COMPOSITIONS FOR THE TREATMENT OF VEHICULAR EXHAUST GASES COMPRISE ZIRCONIUM OXIDE AND CERIUM OXIDE, AND HAVE A HIGH REDUCIBILITY AND A STABLE SPECIFIC SURFACE AREA

(75) Inventors: Stephan Verdier, Lyons (FR); Olivier Larcher, Perigny (FR); Emmanuel Rohart, Sainte Soulle (FR); Bernard Pacaud, Hyogo (JP); Hirofumi Takemori, Tokushima (JP); Eisaku Suda, Tokushima (JP)

(73) Assignee: Rhodia Operations, Aubervilliers Cedex (FR)

( * ) Notice: Subject to any disclaimer, the term of this patent is extended or adjusted under 35 U.S.C. 154(b) by 375 days.

(21) Appl. No.: 12/293,332

(22) PCT Filed: Mar. 19, 2007

(86) PCT No.: PCT/EP2007/052586

§ 371 (c)(1),
(2), (4) Date: Feb. 24, 2009

(87) PCT Pub. No.: WO2007/107546

PCT Pub. Date: Sep. 27, 2007

(65) Prior Publication Data

US 2009/0220398 A1 Sep. 3, 2009

(30) Foreign Application Priority Data

Mar. 21, 2006 (FR) ..................................... 06 02450

(51) Int. Cl.
*B01J 23/10* (2006.01)
*B01J 23/44* (2006.01)
*F01N 3/10* (2006.01)

(52) U.S. Cl. ........ 502/304; 502/302; 502/325; 502/349; 60/299; 60/301

(58) Field of Classification Search .................. 502/302, 502/304, 325, 349; 60/299, 301
See application file for complete search history.

(56) References Cited

U.S. PATENT DOCUMENTS

| | | | | |
|---|---|---|---|---|
| 5,945,370 | A * | 8/1999 | Yokoi et al. | 502/304 |
| 5,948,377 | A * | 9/1999 | Sung | 423/213.5 |
| 7,767,617 | B2 * | 8/2010 | Larcher et al. | 502/304 |
| 2003/0224931 | A1 | 12/2003 | Yamamoto et al. | |
| 2006/0178261 | A1 | 8/2006 | Larcher et al. | |
| 2006/0263284 | A1 | 11/2006 | Larcher et al. | |
| 2007/0189955 | A1 | 8/2007 | Larcher et al. | |

FOREIGN PATENT DOCUMENTS

| | | | |
|---|---|---|---|
| EP | 0 955 267 | B1 | 11/1999 |
| FR | 2 852 591 | A1 | 9/2004 |
| FR | 2 852 596 | A1 | 9/2004 |
| FR | 2 859 470 | A1 | 3/2005 |
| WO | WO 98/45212 | A1 | 10/1998 |

OTHER PUBLICATIONS

Rui Si, Ya-Wen Zhang, Shi-Jie Li, Bing-Xiong Lin and Chun-Hua Yan, "Urea-Based Hydrothermally Derived Homogeneous Nanostructured Ce1 -xZrxO2 (x =0-0.8) Solid Solutions: A Strong Correlation between Oxygen Storage Capacity and Lattice Strain," J. Phys. Chem. B (2004) 108, pp. 12481-12488.*

* cited by examiner

*Primary Examiner* — Stanley Silverman
*Assistant Examiner* — Diana J Liao
(74) *Attorney, Agent, or Firm* — SNR Denton US LLP

(57) ABSTRACT

Catalyst compositions for the treatment of vehicular exhaust gases are based on zirconium and cerium oxides, have a cerium oxide content of at most 50% by weight, a level of reducibility of at least 95% after calcination in air at 600°, and a specific surface area after calcination for 4 hours at 1100° of at least 15 $m^2/g$; such compositions are prepared by forming an aqueous mixture containing zirconium and cerium compounds, by heating this mixture to at least 100° and, after the heating, adjusting it to a basic pH, by adding a surfactant additive to the precipitate obtained from this mixture and by calcinating the precipitate in an inert gas or under vacuum at a temperature of at least 900° and then in an oxidizing atmosphere at a temperature of at least 600°.

18 Claims, No Drawings

CATALYST COMPOSITIONS FOR THE TREATMENT OF VEHICULAR EXHAUST GASES COMPRISE ZIRCONIUM OXIDE AND CERIUM OXIDE, AND HAVE A HIGH REDUCIBILITY AND A STABLE SPECIFIC SURFACE AREA

CROSS-REFERENCE TO PRIORITY/PCT APPLICATIONS

This application claims priority under 35 U.S.C. §119 of FR 0602450, filed Mar. 21, 2006, and is a continuation/national phase of PCT/EP 2007/052586, filed Mar. 19, 2007 and designating the United States (published in the French language on Sep. 27, 2007, as WO 2007/107546 A1; the title and abstract were also published in English), each hereby expressly incorporated by reference in its entirety and each assigned to the assignee hereof.

The present invention relates to a composition based on zirconium oxide and cerium oxide of high reproducibility and of stable specific surface area, to the process for preparing it and to its use especially in the treatment of motor vehicle exhaust gases.

"Multifunctional" catalysts are currently used for the treatment of the exhaust gases from internal combustion engines (motor vehicle postcombustion catalysis). The term "multifunctional" means catalysts capable of performing not only oxidation, in particular of the carbon monoxide and the hydrocarbons present in exhaust gases, but also reduction, especially of the nitrogen oxides also present in these gases ("three-way" catalysts). Zirconium oxide and cerium oxide appear at the present time as two particularly important and advantageous constituents of materials included in the composition of catalysts of this type. To be effective in such a use, these materials must have a specific surface area that remains sufficiently high even at high temperature. Zirconium oxide especially makes it possible to stabilize the surface of products of this type.

Another quality required for these materials is reducibility. The term reducibility means, herein and for the rest of the description, the content of cerium IV in the material that is capable of being converted into cerium III under the effect of a reducing atmosphere and at a given temperature. This reducibility may be measured, for example, by a consumption of hydrogen in a given temperature region. It is due to cerium in the case of compositions of the type such as those of the invention, cerium having the property of being reduced or of being oxidized. This reducibility must, obviously, be as high as possible.

It is moreover still sought to increase the efficacy of these materials, especially during their use as a support for precious metals. In this use, they promote the reduction of nitrogen oxides and the oxidation of carbon monoxide and of hydrocarbons. It is also sought to develop systems that use the smallest possible amount of precious metals. More particularly, palladium-based systems are being developed, since this metal has the advantage of being less expensive than other precious metals such as platinum. At the present time, palladium systems are less efficient than those based on other metals, especially for compositions with a high zirconium content.

The object of the invention is the development of compositions with improved properties, capable of satisfying the characteristics mentioned above, especially of compositions that can be used effectively with palladium.

With this aim, the composition of the invention is based on zirconium oxide and cerium oxide and is characterized in that it has a proportion of cerium oxide of not more than 50% by mass, a specific surface area after calcination for 4 hours at 1100° C. of at least 15 $m^2/g$ and a degree of reducibility of at least 95% after calcination in air at 600° C.

The invention also relates to a composition based on zirconium oxide and cerium oxide in the same proportions and with the same surface characteristic as those given above and having a degree of reducibility of at least 95% after calcination in air at 700° C.

The invention also relates to a composition based on zirconium oxide and cerium oxide in the same proportions and with the same surface characteristic as those given above and having a degree of reducibility of at least 85% after calcination in air at 900° C.

The invention also relates to a process for preparing such a composition, which is characterized in that it comprises the following steps:

(a) an aqueous mixture comprising zirconium and cerium compounds is formed;

(b) the mixture thus formed is heated to a temperature of at least 100° C., as a result of which a precipitate suspended in the reaction medium is obtained;

(c) the reaction medium obtained after the heating is brought to a basic pH;

(d) either, an additive, chosen from anionic surfactants, nonionic surfactants, polyethylene glycols, carboxylic acids and salts thereof and surfactants of carboxymethylated fatty alcohol ethoxylate type, is first added to the medium obtained from the preceding step, and said precipitate is then separated out;

(d') or the precipitate is first separated from the medium obtained from step (c) and said additive is then added to the precipitate;

(e) a first calcination of the precipitate thus obtained is performed under inert gas or under vacuum at a temperature of at least 900° C., followed by a second calcination under an oxidizing atmosphere at a temperature of at least 600° C.

Other characteristics, details and advantages of the invention will emerge even more fully on reading the description that follows, and also the various concrete but nonlimiting examples intended to illustrate it.

In the rest of the description, the term "specific surface area" means the BET specific surface area, determined by adsorption of nitrogen in accordance with ASTM standard D 3663-78 established by the Brunauer-Emmett-Teller method described in the Journal of the American Chemical Society, 60, 309 (1938).

The term "lanthanides" (Ln) means the elements of the group constituted by yttrium and the elements of the periodic table with atomic numbers of between 57 and 71 inclusive.

It is pointed out that, for the rest of the description, unless otherwise indicated, in the ranges of values given, the limit values are included.

The contents are given as the mass of oxides, unless otherwise indicated, these oxides for the expression of these contents being considered in the form of ceric oxide for cerium, in the form $Ln_2O_3$ for the other lanthanides Ln and in the form $Pr_6O_{11}$ in the particular case of praseodymium.

The specific surface area values that are indicated for a given temperature and time correspond, unless otherwise indicated, to calcinations in air at a nominal temperature over the indicated time.

The compositions of the invention are of the mixed oxide type, based on zirconium oxide and also comprise cerium oxide. They may also comprise at least one oxide of another element chosen from lanthanides other than cerium. It is therefore possible to have in this case ternary or especially quaternary compositions. The abovementioned element may be chosen more particularly from yttrium, lanthanum, neodymium or praseodymium. Mention may be made more particularly of compositions based on zirconium, cerium, praseodymium and lanthanum oxides, those based on zirconium, cerium, neodymium and lanthanum oxides and those based on zirconium, cerium, yttrium and lanthanum oxides.

The contents of the various constituents in the compositions of the invention may vary within a certain range of proportions.

For cerium, this content is not more than 50% by mass, more particularly not more than 45% and even more particularly not more than 40%.

Zirconium oxide constitutes the rest of the composition. Thus, the zirconium content may be at least 50% by mass, more particularly at least 55% and even more particularly at least 60%. This content may also be at least 65% and even more particularly at least 70% as a function especially of the possible presence of one or more other elements of the abovementioned type in the composition. Taking this presence also into account, the zirconium content may be less than 50% in the ternary or quaternary compositions.

More specifically, the content of the other possible element or of all of these elements is usually not more than 35%. It may more particularly be not more than 30% and even more particularly not more than 20% or not more than 10%. Moreover, it is preferably at least 3%, more particularly at least 5%. This content may thus be between 3% and 35% in the most general case.

The main characteristic of the compositions of the invention is a high reducibility, which is measured in the present description by a degree of reducibility.

The reducibility of the compositions is determined by measuring their consumption of hydrogen, measured between 30° C. and 900° C. This measurement is taken by programmed reduction at a given temperature using hydrogen diluted in argon. A signal is detected with a heat conductivity detector. The consumption of hydrogen is calculated from the area missing from the hydrogen signal of the baseline at 30° C. to the baseline at 900° C. The degree of reducibility represents the percentage of reduced cerium, it being understood that ½ mol of $H_2$ consumed and measured by the method described above corresponds to 1 mol of reduced CeIV.

The degree of reducibility may vary as a function of the temperature at which the composition may have been calcined during its preparation.

In the present description, the given degrees of reducibility are measured by the method described above on compositions that have undergone a calcination in air for a time that may range from 2 to 4 hours at various temperatures. It will be noted that within this time range, no significant variation in the degree of reducibility is observed. For this reason and unless otherwise indicated, the degrees of reducibility are given for products that have been calcined for 2 hours.

Thus, after calcination for 2 hours in air at 600° C., the compositions of the invention have a degree of reducibility of at least 95%. The degree of reducibility may even reach 100%.

In the case of a calcination for 2 hours in air at 700° C., the compositions of the invention also have a degree of reducibility of at least 95%. The degree of reducibility may in this case also be up to 100%. In general, the degrees of reducibility at 700° C. of the compositions of the invention are identical to those at 600° C. or do not show any significant variations with those measured at 600° C.

In the case of a calcination for 2 hours in air at 900° C., the compositions of the invention moreover have a degree of reducibility of at least 85%.

According to one particular embodiment, the compositions of the invention may have a proportion of cerium oxide of not more than 25%, a content of another lanthanide oxide of not more than 15% and a degree of reducibility of at least 80%, more particularly of at least 85% after calcination in air at 1000° C.

The compositions of the invention also have particular specific surface area characteristics.

Firstly, they have a high surface area at high temperature, i.e. after calcination at 1100° C. for 4 hours, the specific surface area of these compositions is at least 15 $m^2/g$, more particularly at least 20 $m^2/g$ and even more particularly at least 25 $m^2/g$. The highest surface area values are generally obtained for compositions comprising at least one abovementioned element (lanthanide other than cerium) and, for the highest surface area values at 1100° C., a high content of zirconium, i.e. at least 50%.

It may also be noted that the compositions of the invention have surface stability between 900° C. and 1000° C. For the present description, this stability is measured by the variation between the surface area ($S_{900}$) found after calcination at 900° C. for 4 hours and the surface area ($S_{1000}$) found after calcination at 1000° C. for 4 hours, this variation being expressed by the ratio $(S_{900}-S_{1000})/S_{900}$ expressed as a percentage. This variation between 900° C. and 1000° C. may be not more than 25% and more particularly not more than 15%.

A certain degree of surface stability may also be found between 1000° C. and 1100° C. This variation, also expressed by the ratio $(S_{1100}-S_{1000})/S_{1000}$, may be not more than 30% and more particularly not more than 20% after calcination for 4 hours at the abovementioned temperatures.

The process for preparing the compositions of the invention will now be described.

The first step of the process thus consists in preparing an aqueous mixture comprising zirconium and cerium compounds and, in the case of the preparation of compositions based on one or more abovementioned elements, a compound of this or these elements.

The compounds are preferably soluble compounds. They may especially be zirconium, cerium and lanthanide salts. These compounds may be chosen from nitrates, sulfates, acetates, chlorides, ceri-ammoniacal nitrate or, for zirconium or cerium, the (oxo)hydroxides of these elements.

Examples that may thus be mentioned include zirconyl sulfate, zirconyl nitrate and zirconyl chloride. Zirconyl nitrate is most generally used. Mention may also be made in particular of cerium IV salts such as nitrates or ceri-ammoniacal nitrate, for example, which are particularly suitable for use herein. Ceric nitrate may be used. It is advantageous to use salts with a purity of at least 99.5% and more particularly of at least 99.9%. An aqueous solution of ceric nitrate may be obtained, for example, by reacting nitric acid with a hydrated ceric oxide prepared in a conventional manner by reacting a solution of a cerous salt, for example cerous nitrate, and an aqueous ammonia solution in the presence of hydrogen peroxide. It is also possible, in particular, to use a ceric nitrate solution obtained according to the process of electrolytic oxidation of a cerous nitrate solution as described in document FR-A-2 570 087, and which constitutes herein an advantageous starting material.

It will be noted that the aqueous solutions of cerium salts and of zirconyl salts may have a certain initial free acidity, which may be adjusted by addition of a base or an acid. It is, however, equally possible to use an initial solution of cerium and zirconium salts effectively having a certain free acidity as mentioned above, or solutions that will have been more or less vigorously preneutralized. This neutralization may be performed by adding a basic compound to the abovementioned mixture so as to limit this acidity. This basic compound may be, for example, a solution of aqueous ammonia or alternatively of alkali metal (sodium, potassium, etc.) hydroxides, but preferably an aqueous ammonia solution.

Finally, it will be noted that when the starting mixture contains a cerium compound in which this element is in the form of Ce III, it is preferable to introduce during the process an oxidizing agent, for example hydrogen peroxide. This oxidizing agent may be used by being added to the reaction medium during step (a) or during step (b), especially at the end thereof.

It is also possible to use a sol as zirconium or cerium starting compounds. The term "sol" denotes any system constituted by fine solid particles of colloidal sizes, i.e. sizes of between about 1 nm and about 500 nm, based on a zirconium or cerium compound, this compound generally being a zirconium or cerium oxide and/or hydrated oxide, suspended in an aqueous liquid phase, said particles also possible containing residual amounts of bound or adsorbed ions, for instance nitrates, acetates, chlorides or ammoniums. It will be noted that in such a sol, the zirconium or the cerium may be either totally in the form of colloids, or simultaneously in the form of ions and in the form of colloids.

The mixture may be obtained, without preference, either from compounds that are initially in the solid state, which will be introduced thereafter into a water stock, for example, or alternatively directly using solutions of these compounds followed by mixing, in any order, of said solutions.

Once the initial mixture is thus obtained, heating of this mixture is then performed, in accordance with the second step (b) of the process according to the invention.

The temperature at which this heat treatment is performed is at least 100° C. It may thus be between 100° C. and the critical temperature of the reaction medium, in particular between 100 and 350° C. and preferably between 100 and 200° C.

The heating operation may be performed by introducing the aqueous mixture containing the abovementioned compounds into a closed chamber (closed reactor of the autoclave type), the necessary pressure then resulting solely from the heating of the reaction medium (autogenous pressure). Under the temperature conditions given above, and in aqueous media, it may thus be pointed out, as an illustration, that the pressure in the closed reactor may range between a value of greater than 1 bar ($10^5$ Pa) and 165 bar ($1.65\times10^7$ Pa), preferably between 5 bar ($5\times10^5$ Pa) and 165 bar ($1.65\times10^7$ Pa). It is obviously also possible to exert an external pressure, which then adds to the pressure arising from the heating.

The heating may also be performed in an open reactor for temperatures in the region of 100° C.

The heating may be performed either in air, or in an atmosphere of an inert gas, preferably nitrogen in this case.

The duration of the treatment is not critical, and may thus vary within wide ranges, for example between 1 and 48 hours and preferably between 2 and 24 hours. Similarly, the temperature rise is performed at a rate that is not critical, and the set reaction temperature may thus be reached by heating the medium, for example, for between 30 minutes and 4 hours, these values being given purely as a guide.

After this second step, a precipitate suspended in the reaction medium is obtained.

The third step (c) of the process consists in bringing the reaction medium previously obtained to a basic pH. This operation is performed by adding to the medium a base such as, for example, an aqueous ammonia, solution.

The term "basic pH" means a pH value of greater than 7 and preferably greater than 8.

It is also possible, at this stage of the process, to perform maturation. This may be performed directly on the reaction medium obtained after addition of the base or on a suspension obtained after returning the precipitate into water. The maturation is performed by heating the medium. The temperature to which the medium is heated is at least 40° C., more particularly at least 60° C. and even more particularly at least 100° C. The medium is thus maintained at a constant temperature for a time that is usually at least 30 minutes and more particularly at least 1 hour. The maturation may be performed at atmospheric pressure or optionally at a higher pressure. It may be noted that it is possible to perform a second maturation after separating the precipitate from the reaction medium obtained after the first maturation and returning this precipitate into water, this second maturation being performed under the conditions described for the first.

The rest of the process may be performed according to two variants, i.e. according to step (d) or (d') described above.

According to a first embodiment corresponding to step (d), an additive chosen from anionic surfactants, nonionic surfactants, polyethylene glycols, carboxylic acids and salts thereof, and surfactants of the carboxymethylated fatty alcohol ethoxylate type is added to the reaction medium obtained from the preceding step. As regards this additive, reference may be made to the teaching of patent application WO 98/45212 and the surfactants described in said document may be used.

Surfactants of the anionic type that may be mentioned include ethoxycarboxylates, ethoxylated or propoxylated fatty acids, especially those of the brand Alkamuls®, sarcosinates of formula, $R—C(O)N(CH_3)CH_2COO^-$, betaines of formula $RR'NH—CH_2—COO^-$, R and R' being alkyl or alkyl-aryl groups, phosphate esters, especially those of the brand Rhodafac®, sulfates such as alcohol sulfates, alcohol ether sulfates and sulfated alkanolamide ethoxylates, and sulfonates, for instance sulfo-succinates and alkylbenzene or alkylnaphthalene sulfonates.

Nonionic surfactants that may be mentioned include acetylenic surfactants, ethoxylated or propoxylated fatty alcohols, for example those of the brands Rhodasurf® or Antarox®, alkanolamides, amine oxides, ethoxylated alkanolamides, long-chain ethoxylated or propoxylated amines, for example those of the brand Rhodameen®, copolymers of ethylene oxide/propylene oxide, sorbitan derivatives, ethylene glycol, propylene glycol, glycerol, polyglyceryl esters and ethoxylated derivatives thereof, alkylamines, alkylimidazolines, ethoxylated oils and ethoxylated or propoxylated alkyl-phenols, especially those of the brand name Igepal®. Mention may also be made in particular of the products mentioned in WO 98/45212 under the brand names Igepal®, Dowanol®, Rhodamox® and Alkamide®.

As regards the carboxylic acids, it is especially possible to use aliphatic monocarboxylic or dicarboxylic acids and, among these, more particularly saturated acids. Fatty acids and more particularly saturated fatty acids may also be used. Mention may thus be made especially of formic acid, acetic acid, propionic acid, butyric acid, isobutyric acid, valeric acid, caproic acid, caprylic acid, capric acid, lauric acid, myristic acid, palmitic acid, stearic acid, hydroxystearic acid, 2-ethylhexanoic acid and behenic acid. Dicarboxylic acids that may be mentioned include oxalic acid, malonic acid, succinic acid, glutaric acid, adipic acid, pimelic acid, suberic acid, azelaic acid and sebacic acid.

Salts of the carboxylic acids may also be used.

Finally, it is possible to use a surfactant chosen from those of the carboxymethylated fatty alcohol ethoxylate type.

The term “product of the carboxymethylated fatty alcohol ethoxylate type” means products constituted of ethoxylated or propoxylated fatty alcohols comprising a —$CH_2$—COOH group at the end of the chain.

These products may correspond to the formula:

$$R_1—O—(CR_2R_3—CR_4R_5—O)_n—CH_2—COOH$$

in which $R_1$ denotes a saturated or unsaturated carbon-based chain whose length is generally not more than 22 carbon atoms and preferably at least 12 carbon atoms; $R_2$, $R_3$, $R_4$ and $R_5$ may be identical and represent hydrogen, or $R_2$ may represent a $CH_3$ group and $R_3$, $R_4$ and $R_5$ represent hydrogen; n is a nonzero integer that may be up to 50 and more particularly between 5 and 15, these values being included. It will be noted that a surfactant may be constituted of a mixture of products of the above formula for which $R_1$ may be saturated and unsaturated, respectively, or alternatively products comprising both —$CH_2$—$CH_2$—O— and —$C(CH_3)_2$—$CH_2$—O— groups.

It is obviously possible to use a mixture of additives of the type described above.

After addition of the surfactant, the precipitate is optionally separated from the liquid medium by any known means.

Another embodiment, which corresponds to the implementation of step (d'), consists in first separating the precipitate from the reaction medium obtained from step (c), this being performed by any known means, and then in adding the surfactant additive to this precipitate, by impregnation of the precipitate or by solid/solid mixing as a function of the state of the surfactant used.

In general, the amount of additive or surfactant used, expressed as a weight percentage of additive relative to the weight of the composition calculated as oxide, is generally between 5% and 100% and more particularly between 15% and 60%.

The final step of the process, step (e), comprises a double calcination of the precipitate obtained previously.

The first calcination is performed under an inert gas or under vacuum. The inert gas may be helium, argon or nitrogen. The vacuum is generally a primary vacuum with a partial pressure of oxygen of less than $10^{-1}$ mbar. The calcination temperature is at least 900° C. A temperature below this value has the risk of not leading to a product having the reducibility characteristics given above. Increasing the calcination temperature results in an increase in the reducibility, which may reach values of 100% at the highest temperatures. The temperature is also set at a value taking into account that the specific surface area of the product is proportionately lower the higher the calcination temperature. Thus, generally, the maximum calcination temperature is not more than 1000° C. since, beyond this temperature, the specific surface area has the risk of being insufficient. The duration of this first calcination is generally at least 2 hours, preferably at least 4 hours and especially at least 6 hours. An increase in this duration usually results in an increase in the degree of reducibility. Needless to say, the duration may be set as a function of the temperature, a short calcination time requiring a higher temperature.

A second calcination is then performed in an oxidizing atmosphere, for example in air. In this case, the calcination is generally performed at a temperature of at least 600° C. for a time generally of at least 30 minutes. A temperature lower than 600° C. may make it difficult to remove the additives used during step (d) or (d') described above. It is preferable not to exceed a calcination temperature of 900° C.

The compositions of the invention as described above or as obtained by the process mentioned above are in the form of powders, but may optionally be formed to be in the form of granules, beads, cylinders or honeycombs of variable sizes. These compositions may be applied to any support usually used in the field of catalysis, i.e. especially thermally inert supports. This support may be chosen from alumina, titanium oxide, cerium oxide, zirconium oxide, silica, spinels, zeolites, silicates, crystalline silicoaluminum phosphates and crystalline aluminum phosphates.

The compositions may also be used in catalytic systems. These catalytic systems may comprise a coating (wash coat) with catalytic properties and based on these compositions, on a substrate of the metallic monolith or ceramic type, for example. The coating may also comprise a support of the type such as those mentioned hereinabove. This coating is obtained by mixing the composition with the support so as to form a suspension that may then be deposited on the substrate.

These catalytic systems and more particularly the compositions of the invention may find numerous applications. They are thus particularly suitable for, and thus usable in, the catalysis of various reactions, for instance dehydration, hydrosulfuration, hydro-denitrification, desulfuration, hydrodesulfuration, dehydrohalogenation, reforming, vapor reforming, cracking, hydrocracking, hydrogenation, dehydro-genation, isomerization, dismutation, oxychlorination, dehydrocyclization of hydrocarbons or other organic compounds, reduction and/or oxidation reactions, in particular of linear or branched aromatic hydrocarbons, of methane or of CO, the Claus reaction, the treatment of the exhaust gases of internal combustion engines, demetallation, methanation, shift conversion, catalytic oxidation of the soots emitted by internal combustion engines such as diesel or petrol engines running in poor regime. The catalytic systems and the compositions of the invention may finally be used in combination with NOx scavengers.

Among the mentioned uses, the treatment of the exhaust gases of internal combustion engines (motor vehicle post-combustion catalysis) using the abovementioned catalytic systems constitutes a particularly advantageous application.

In the case of these uses in catalysis, the compositions of the invention may be used in combination with precious metals. The invention thus relates to catalytic systems, of the type described above, in which the compositions of the invention are used as support for precious metals. The nature of these metals and the techniques for incorporating them into these compositions are well known to those skilled in the art. For example, the metals may be platinum, rhodium, palladium or iridium, and may especially be incorporated into the compositions by impregnation. According to one particular embodiment of the invention, the catalytic system contains palladium as precious metal. The content of precious metal in such systems is generally not more than 10%, preferably not more than 5% and even more preferentially not more than 1%, this amount being expressed as mass of metal relative to the metal/oxide-based composition combination of the invention. This content may vary especially as a function of the desired application and of the nature of the oxide-based composition.

It is interesting to note that the compositions of the invention may give results similar to those of the prior art for an amount of precious metal at least 10% lower.

Examples will now be given.

The evaluation tests mentioned in the examples were performed under the following conditions.

Degree of Reducibility

The degree of reducibility of cerium is measured by performing a reduction at a programmed temperature on an Ohkura Riken TP5000 machine. This machine measures the consumption of hydrogen of a composition according to the invention as a function of the temperature and deduces therefrom the degree of reduction of the cerium.

More specifically, hydrogen is used as reducing gas at 10% by volume in argon with a flow rate of 30 mL/minute. The experimental protocol consists in weighing out 200 mg of the sample in a pretared container. The sample is then introduced into a quartz cell containing quartz wool at the bottom. The sample is finally covered with quartz wool and placed in the oven of the measuring machine. The temperature program is as follows:

- oxidation: temperature rise up to 500° C. at an increase rate of 10° C./minute under $O_2$ at 5 vol % in He;
- 30-minute steady stage, followed by decrease to 30° C.;
- treatment at 30° C. under Ar for 20 minutes;
- reduction: temperature rise up to 900° C. with an increase rate of 20° C./minute under $H_2$ at 10 vol % in Ar;
- calibration;
- temperature decrease under Ar from 900° C. to 30° C.

During this program, the temperature of the sample is measured using a thermocouple placed in the quartz cell above the sample. The hydrogen consumption during the reduction phase is deduced by means of the calibration of the variation in thermal conductivity of the gas flow measured at the outlet of the cell using a thermal conductivity detector (TCD).

The degree of reduction of the cerium is calculated from the hydrogen consumption measured between 30° C. and 900° C.

Dynamic Three-Way Catalytic Test

This test makes it possible to evaluate under dynamic conditions (oscillation frequency of 1 Hz) the performance qualities of monometallic catalysts in powder form with respect to the elimination of the pollutants CO, NO and hydrocarbons. The hydrocarbons used in the test are propane and propene. Several measurements are taken isothermically by varying the richness of the gas mixture between the values 0.980 and 1.015. The table that follows gives the composition of this gas mixture for these two values. The evaluation temperature is 480° C. and the mass of catalyst 20 mg mixed with 150 mg of SiC used as inert diluent. The catalytic performance qualities are given as COP (cross over point), which is defined as the point of intersection of the curves for the conversion of CO and NO as a function of the richness of the mixture.

For this test, a composition according to the invention is impregnated with a solution of palladium or rhodium precious metal nitrate. In the case of palladium, a mass content of 0.5% of palladium element is set. In the case of rhodium, a mass content of 0.1% or 0.07% of rhodium element is set. The product is then dried and activated in air at 500° C. for 4 hours. Before performing the test, aging is performed at 950° C. for 16 hours or at 1050° C. for 48 hours, by alternating an oxidizing flux 1.8 vol % $O_2$/10 vol % $H_2O$/qs $N_2$ for a duration of 5 minutes and a reducing flux 1.8 vol % CO/10 vol % $H_2O$/qs $N_2$ for a duration of 5 minutes.

| Composition | Vol % richness 0.98 | Vol % richness 1.024 |
|---|---|---|
| $CO_2$ | 14.00 | 14.00 |
| $H_2O$ | 10.00 | 10.00 |
| CO | 0.40 | 1.40 |
| $O_2$ | 0.80 | 0.40 |
| $C_3H_6$ | 0.0375 | 0.0375 |
| $C_3H_8$ | 0.0125 | 0.0125 |
| NO | 0.095 | 0.095 |
| $N_2$ | remainder | remainder |

Light-Off Three-Way Catalytic Test

This light-off test makes it possible to evaluate the temperature at which the three-way catalysts in powder form reach 20% or 50% conversion (T20 or T50) with respect to the pollutants CO, NO and hydrocarbons. The rich light-off test is performed with a gas mixture of richness 1.024. The poor light-off test is performed with a gas mixture with a richness of 0.98. The 20 mg mass of catalyst is mixed with 150 mg of SiC used as inert diluent. The conversion with respect to the pollutants mentioned above is then measured as a function of the temperature, which ranges between 200 and 500° C. with a heating rate of 25° C./minute. The light-off performance for each pollutant is expressed as T20, the temperature at which 20% conversion is achieved.

For this test, a composition according to the invention is impregnated with a solution of nitrate of a precious metal such as palladium or rhodium. The product is then dried and activated in air at 500° C. for 4 hours. Before performing the test, aging is performed at 950° C. for 16 hours or at 1050° C. for 48 hours, by alternating an oxidizing flux 1.8 vol % $O_2$/10 vol % $H_2O$/qs $N_2$ for a duration of 5 minutes, and a reducing flux 1.8 vol % CO/10 vol % $H_2O$/qs $N_2$ for a duration of 5 minutes.

EXAMPLE 1

This example concerns the preparation of a composition according to the invention based on cerium, zirconium and lanthanum oxides in respective mass proportions of oxide of 47%, 47% and 6%.

In the stoichiometric proportions required to obtain the above composition, a solution of ceric nitrate, a solution of lanthanum nitrate and a solution of zirconyl nitrate are mixed together.

The concentration of this mixture (expressed as oxide of the various elements) is adjusted to 80 g/l. This mixture is then maintained at 150° C. for 4 hours.

An aqueous ammonia solution is then added to the reaction medium such that the pH is greater than 8.5. The reaction medium thus obtained is boiled for 2 hours. After separation of the phases by settling and then drawing down, the solid product is resuspended and the medium thus obtained is treated for 1 hour at 100° C.

The suspension thus obtained is then filtered on a Büchner funnel. A precipitate containing 35% by mass of oxide is recovered.

100 g of this precipitate are taken.

In parallel, an ammonium laurate gel was prepared under the following conditions: 250 g of lauric acid are introduced into 135 ml of aqueous ammonia (12 mol/l) and 500 ml of distilled water, and the mixture is then homogenized using a spatula.

28 g of this gel are added to 100 g of the precipitate and the mixture is then blended until a homogeneous paste is obtained.

The first calcination is performed under nitrogen with a flow rate of 300 $cm^3$/minute at a temperature of 1000° C. for 4 hours at this stage. The product is then returned to room temperature. The second calcination is performed in air with a flow rate of 300 $cm^3$/minute at a temperature of 600° C. for 2 hours at this stage.

The product thus obtained has a surface area of 27 $m^2$/g.

The surface areas obtained after subsequent calcinations at different temperatures are indicated below.

4 hours 1000° C.=26 $m^2$/g 4 hours 1100° C.=23 $m^2$/g.

The variation in surface area for calcination temperatures of between 1000° C. and 1100° C. is 12%.

The degrees of reducibility and a maximum reducibility temperature after calcination in air at different temperatures are moreover given below. For the value at 600° C., this concerns the product as obtained after the procedure described above in this example. For the other temperature value, this concerns the same product which then underwent an additional calcination for the time and at the temperature indicated.

2 hours 600° C. degree of reducibility=100% Tmax=580° C.

2 hours 900° C. degree of reducibility=88%

EXAMPLE 2

This example concerns the preparation of a composition according to the invention based on cerium, zirconium, lanthanum and yttrium oxides in respective mass proportions of oxide of 40%, 50%, 5% and 5%.

In the stoichiometric proportions required to obtain the above compositions, a procedure identical to that of Example 1 is followed. The precursor used for yttrium is an yttrium nitrate solution. The precipitate has an oxide content of 35%. 41.4 g of ammonium laurate are used per 100 g of precipitate.

The product thus obtained has a surface area of 36 $m^2$/g.

The surface areas obtained after subsequent calcinations at different temperatures are indicated below.

4 hours 1000° C.=34 $m^2$/g 4 hours 1100° C.=27 $m^2$/g

The variation in surface area for calcination temperatures of between 1000° C. and 1100° C. is 21%.

The degrees of reducibility and a maximum reducibility temperature after calcination in air at different temperatures are moreover given below. For the value at 600° C., this concerns the product as obtained after the procedure described above in this example. For the other temperature value, this concerns the same product, which then underwent an additional calcination for the time and at the temperature indicated.

2 hours 600° C. degree of reducibility=96% Tmax=560° C.

2 hours 900° C. degree of reducibility=88%

The results of the aging tests as described previously and obtained on the product derived from the preparation process described above, i.e. especially after a first calcination of 1000° C. for 4 hours and a second calcination of 600° C. for 2 hours, are moreover given below.

After redox aging at 950° C. for 16 hours, the light-off three-way catalytic test in rich medium indicates that this product impregnated with 0.1% by mass of rhodium achieves 20% conversion of NO at 350° C. and 20% conversion of propene at 360° C.

After redox aging at 1050° C./48 hours, the light-off three-way catalytic test in rich medium indicates that this product impregnated with 0.1% by mass of rhodium achieves 50% conversion of NO at 405° C., 50% conversion of propene at 408° C. and 20% conversion of CO at 345° C.

Similarly, after redox aging at 1050° C./48 hours, the light-off three-way catalytic test in poor medium indicates that this product impregnated with 0.1 by mass of rhodium achieves 50% conversion of CO at 360° C. and 50% conversion of propene at 390° C.

After redox aging at 1050° C./48 hours, the dynamic three-way catalytic test indicates a 95% conversion at the COP for a product impregnated with 0.1% by mass of rhodium. A 92.5% conversion at the COP is obtained for a product impregnated with 0.07% by mass of rhodium. The 30% decrease in the mass content of rhodium leads to a 2.5% decrease in the COP.

EXAMPLE 3

This example concerns the preparation of a composition according to the invention based on cerium, zirconium, lanthanum and neodymium oxides in respective mass proportions of oxide of 21%, 72%, 2% and 5%.

In the stoichiometric proportions required to obtain the above composition, a procedure identical to that of Example 1 is followed. The precursor used for neodymium is a neodymium nitrate solution. The precipitate has an oxide content of 30%. 35.5 g of ammonium laurate are used per 100 g of precipitate.

The product thus obtained has a surface area of 40 $m^2$/g.

The surface areas obtained after subsequent calcinations at various temperatures are indicated below.

4 hours 1000° C.=38 $m^2$/g 4 hours 1100° C.=27 $m^2$/g

The variation in surface area for calcination temperatures of between 1000° C. and 1100° C. is 29%.

The degrees of reducibility and a maximum reducibility temperature after calcination in air at various temperatures are moreover given below. For the value at 600° C., this concerns the product as obtained after the procedure described above in this example. For the other temperature value, this concerns the same product, which then underwent an additional calcination for the time and at the temperature indicated.

2 hours 600° C. degree of reducibility=100% Tmax=540° C.

2 hours 900° C. degree of reducibility=90%

2 hours 1000° C. degree of reducibility=87%

The results obtained on the product obtained from the preparation process described above, i.e. especially after a first calcination of 1000° C. for 4 hours and a second calcination of 600° C. for 2 hours after the three-way catalytic tests described previously, are moreover given below.

The dynamic three-way catalytic test indicates a 94% conversion at the COP for a product impregnated with 0.5% by mass of palladium. For a richness of 1.005, the degree of conversion of NOx measured in this test is 99%.

In the light-off three-way catalytic test in rich medium, this product impregnated with 0.5% by mass of palladium achieves a 20% conversion of NO at a temperature of 400° C.

EXAMPLE 4

This example concerns the preparation of a composition according to the invention based on cerium, zirconium and lanthanum oxides in respective mass proportions of oxide of 30%, 42% and 28%.

In the stoichiometric proportions required to obtain the above composition, a procedure identical to that of Example 1 is followed. The precipitate has an oxide content of 34%. 40 g of ammonium laurate are used per 100 g of precipitate.

The product thus obtained has a surface area, of 23 $m^2/g$ and a degree of reducibility of 98% measured at 600° C., the maximum reducibility temperature being 625° C.

The surface areas obtained after subsequent calcinations at various temperatures are indicated below.

4 hours 1000° C.=21 $m^2/g$ 4 hours 1100° C.=17 $m^2/g$

The variation in surface area for calcination temperatures of between 1000° C. and 1100° C. is 19%.

COMPARATIVE EXAMPLE 5

This example concerns the preparation of a composition similar to that of Example 3, i.e. based on cerium, zirconium, lanthanum and neodymium oxides in respective mass proportions of oxide of 21%, 72%, 2% and 5%.

900 ml of zirconyl nitrate (80 g/l), 42.3 ml of cerium nitrate in oxidation state III (496 g/l), 4.4 ml of lanthanum nitrate (454 g/l) and 9.5 ml of neodymium nitrate (524 g/l) are introduced into a stirred beaker. The mixture is then made up with distilled water so as to obtain 1 liter of a solution of these nitrates.

250 ml of an aqueous ammonia solution (12 mol/l) and 74 ml of hydrogen peroxide (110 volumes) are introduced into a stirred reactor and the volume is then made up with distilled water so as to obtain a total volume of 1 liter.

The nitrate solution is introduced over one hour into the reactor with constant stirring so as to obtain a suspension.

The suspension obtained is placed in a stainless-steel autoclave equipped with a stirring rotor. The temperature of the medium is maintained at 150° C. for 2 hours with stirring.

The suspension thus obtained is filtered off on a Büchner funnel. A pale yellow precipitate containing 23% by mass of oxide is obtained. 76 g of this precipitate are taken.

In parallel, an ammonium laurate gel was prepared under the following conditions: 250 g of lauric acid are introduced into 135 ml of aqueous ammonia (12 mol/l) and 500 ml of distilled water, and the mixture is then homogenized using a spatula.

21 g of this gel are added to 76 g of the precipitate in a ball mill and the whole is then ground until a homogeneous paste is obtained.

The product is then calcined in air at 700° C. for 4 hours at this stage.

The product thus obtained has a surface area of 80 $m^2/g$.

The surface areas obtained after subsequent calcinations at different temperatures are indicated below.

4 hours 900° C.=55 $m^2/g$ 4 hours 1000° C.=43 $m^2/g$ 4 hours 1100° C.=22 $m^2/g$ The variation in surface area for calcination temperatures of between 1000° C. and 1100° C. is 49%.

The variation in surface area for calcination temperatures of between 900° C. and 1000° C. is 22%.

The reducibility values after calcination at different temperatures are indicated below. For the value at 700° C., this concerns the product as obtained after the procedure described above in this example. For the other temperature values, this concerns the same product, which then underwent an additional calcination for the time and at the temperature indicated.

4 hours 700° C. degree of reducibility=85%

2 hours 900° C. degree of reducibility=80%

2 hours 1000° C. degree of reducibility=78%

The three-way catalytic test indicates an 86% conversion at the COP for a product impregnated with 0.5% by mass of palladium. For a richness of 1.005, the degree of conversion of NOx measured in this test is 89%.

In the light-off three-way catalytic test in rich medium, this product impregnated with 0.5% by mass of palladium achieves a 20% conversion of NO at a temperature of 415° C.

COMPARATIVE EXAMPLE 6

This example concerns the preparation of a composition similar to that of Example 2, i.e. based on cerium, zirconium, lanthanum and yttrium oxides in respective mass proportions of oxide of 40%, 50%, 5% and 5%.

In the stoichiometric proportions required to obtain the above composition, a procedure identical to that of Example 5 is followed. The precursor used for yttrium is an yttrium nitrate solution. The precipitate has an oxide content of 25%. 29 g of ammonium laurate are used per 100 g of precipitate.

The product thus obtained has a surface area of 73 $m^2/g$.

The surface areas obtained after subsequent calcinations at various temperatures are indicated below.

4 hours 900° C.=54 $m^2/g$ 4 hours 1000° C.=43 $m^2/g$ 4 hours 1100° C.=20 $m^2/g$ The variation in surface area for calcination temperatures of between 1000° C. and 1100° C. is greater than 53%.

The variation in surface area for calcination temperatures of between 900° C. and 1000° C. is 26%.

The reducibility values after calcination at different temperatures are indicated below. For the value at 700° C., this concerns the product as obtained after the procedure mentioned above in this example. For the other temperature value, this concerns the same product, which then underwent an additional calcination for the time and at the temperature indicated.

2 hours 700° C. degree of reducibility=68%

2 hours 900° C. degree of reducibility=63%

The results of the aging tests as described previously and obtained on the product derived from the preparation process described above for Example 5, i.e. after a calcination at 700° C. for 4 hours, are moreover given below.

After a redox aging at 950° C./16 hours, the light-off three-way catalytic test in rich medium indicates that this product impregnated with 0.1% by mass of rhodium achieves a 20% conversion of NO at 390° C. and a 20% conversion of propene at 395° C.

After redox aging at 1050° C./48 hours, the light-off three-way catalytic test in rich medium indicates that this product impregnated with 0.1% by mass of rhodium achieves a 50% conversion of NO at 430° C., a 50% conversion of propene at 426° C. and a 20% conversion of CO at 365° C.

After a redox aging at 1050° C./48 hours, the light-off three-way catalytic test in poor medium indicates that this product impregnated with 0.1% by mass of rhodium achieves a 50% conversion of CO at 390° C. and a 50% conversion of propene at 450° C.

After redox aging at 1050° C./48 hours, the dynamic three-way catalytic test indicates a 91% conversion at the COP for a product impregnated with 0.1% by mass of rhodium. An 84% conversion at the COP is obtained for a product impregnated with 0.07% by mass of rhodium. The 30% decrease in the mass content of rhodium results in a 6% decrease in the COP.

Table 1 below summarizes the results at the COP of the dynamic three-way catalytic test after redox aging at 1050° C./48 hours for the compositions of Examples 2 and 6, which have the same contents of oxides.

TABLE 1

| | Degree of conversion at the COP | |
|---|---|---|
| | Example 2 | Comparative Example 6 |
| Rhodium content | | |
| (1) 0.1% | 95% | 91% |
| (2) 0.07% | 92.5% | 84% |
| Variation of the degree of conversion between (1) and (2) in % | 2.5 | 6 |

It is seen that the composition of the invention has a variation of its catalytic properties that is markedly lower than that of the comparative composition when the rhodium content decreases by 30%, but also that its properties for the lowest rhodium content remain higher than those of the comparative composition for the highest content.

Table 2 below summarizes the results at the COP for the dynamic and light-off three-way catalytic tests for the compositions of Examples 3 and 5, which have the same oxide contents, and are impregnated with 0.5% by mass of palladium.

TABLE 2

| | Example 3 | Comparative Example 5 |
|---|---|---|
| Dynamic 3-way test: | | |
| % at the COP | 94% | 86% |
| Degree of conversion of NO*x* (richness 1.005) | 99% | 89% |
| Light-off 3-way test rich medium: | | |
| Temperature for a 20% conversion of NO | 400° C. | 415° C. |

It is seen that the composition of the invention shows with palladium high efficacy superior to that of the comparative example.

The invention claimed is:

1. A catalyst composition useful for the treatment of vehicular exhaust gases comprises zirconium oxide and cerium oxide, having a proportion of cerium oxide of not more than 50% by mass, a degree of reducibility of at least 95% after calcination in air at 600° C. and a specific surface area after calcination for 4 hours at 1100° C. of at least 15 $m^2/g$.

2. The catalyst composition as defined by claim 1, having a proportion of cerium oxide of not more than 50% by mass, a degree of reducibility of at least 95% after calcination in air at 700° C. and a specific surface area after calcination for 4 hours at 1100° C. of at least 15 $m^2/g$.

3. The catalyst composition as defined by claim 1, having a proportion of cerium oxide of not more than 50% by mass, a degree of reducibility of at least 85% after calcination in air at 900° C. and a specific surface area after calcination for 4 hours at 1100° C. of at least 15 $m^2/g$.

4. The catalyst composition as defined by claim 1, further comprising at least one oxide of another element selected from among the lanthanides other than cerium.

5. The catalyst composition as defined by claim 4, comprising at least one oxide of a lanthanide selected from among yttrium, lanthanum, neodymium and praseodymium.

6. The catalyst composition as defined by claim 1, having a proportion of cerium oxide of not more than 45%.

7. The catalyst composition as defined by claim 1, having a proportion of cerium oxide of not more than 40%.

8. The catalyst composition as defined by claim 4, having a proportion of cerium oxide of not more than 25%, a content of another lanthanide oxide of not more than 15% and a degree of reducibility of at least 80% after calcination in air at 1000° C.

9. The catalyst composition as defined by claim 1, having a specific surface area after calcination for 4 hours at 1100° C. of at least 20 $m^2/g$.

10. The catalyst composition as defined by claim 4, having a lanthanide content of from 3% to 35%.

11. The catalyst composition as defined by claim 1, having a variation in specific surface area of not more than 30% after calcination for 4 hours at 1000° C. and then for 4 hours at 1100° C.

12. A process for preparing a catalyst composition, which comprises the following steps:

(a) providing an aqueous mixture comprising zirconium and cerium compounds, and optionally of another element;

(b) heating this mixture to a temperature of at least 100° C. and obtaining a precipitate suspended in the reaction medium;

(c) adjusting the reaction medium obtained after heating to a basic pH;

(d) adding either an additive selected from the group consisting of anionic surfactants, nonionic surfactants, polyethylene glycols, carboxylic acids and salts thereof and surfactants of carboxymethylated fatty alcohol ethoxylate type, to the medium obtained from the preceding step, and then separating said precipitate;

(d') or the precipitate is first separated from the medium obtained from step (c) and said additive is then added to the precipitate;

(e) first calcinating the precipitate thus obtained under inert gas or under vacuum at a temperature of at least 900° C., followed by a second calcination under an oxidizing atmosphere at a temperature of at least 600° C., wherein the catalyst composition is useful for the treatment of vehicular exhaust gases and comprises zirconium oxide and cerium oxide, having a proportion of cerium oxide of not more than 50% by mass, a degree of reducibility of at least 95% after calcination in air at 600° C. and a specific surface area after calcination for 4 hours at 1100° C. of at least 15 $m^2/g$.

13. The process as defined by claim 12, wherein after step (c), maturation of the reaction medium is performed by heating the medium to a temperature of at least 40° C.

14. The process as defined by claim 12, wherein the compounds of zirconium, of cerium and of any other element are selected from the group consisting of nitrates, sulfates, acetates, chlorides and ceri-ammoniacal nitrate.

15. The process as defined by claim 12, wherein the second calcination is performed in air.

16. A catalytic system including the catalyst composition as defined by claim 1.

17. A catalytic system including the catalyst composition as defined by claim 1, having palladium values supported thereon.

18. A process for treating the exhaust gases from an internal combustion engine, comprising conveying same through the catalytic system as defined by claim 16.

* * * * *